United States Patent
Grotenhuis et al.

(10) Patent No.: US 9,346,113 B1
(45) Date of Patent: May 24, 2016

(54) ELECTRICAL DISCHARGE MACHINING INTEGRATED CONTROL SYSTEM

(71) Applicant: Johnson Technology, Inc., Muskegon, MI (US)

(72) Inventors: Kim Michael Grotenhuis, Hudsonville, MI (US); Dale Duncan Palmer, Twin Lake, MI (US); Chad Michael Vandenbosch, Muskegon, MI (US)

(73) Assignee: JOHNSON TECHNOLOGY, INC., Muskegon, MI (US)

( * ) Notice: Subject to any disclaimer, the term of this patent is extended or adjusted under 35 U.S.C. 154(b) by 0 days.

(21) Appl. No.: 14/662,821

(22) Filed: Mar. 19, 2015

(51) Int. Cl.
*B23H 7/18* (2006.01)
*B23H 7/20* (2006.01)
*B23H 7/32* (2006.01)
*B23H 1/02* (2006.01)

(52) U.S. Cl.
CPC . *B23H 7/32* (2013.01); *B23H 1/024* (2013.01)

(58) Field of Classification Search
CPC ............ B23H 1/024; B23H 1/00; B23H 7/26; B23H 7/32; B23H 7/18; B23H 7/20
See application file for complete search history.

(56) References Cited

U.S. PATENT DOCUMENTS

| | | | | |
|---|---|---|---|---|
| 3,725,631 A * | 4/1973 | Angelucci et al. | ......... | 219/69.16 |
| 4,247,749 A * | 1/1981 | Wavre | ..................... | B23H 7/28 |
| | | | | 219/69.17 |
| 4,491,712 A * | 1/1985 | Ito | ........................... | B23H 7/28 |
| | | | | 219/69.16 |
| 4,564,912 A * | 1/1986 | Schwefel | ........... | G05B 19/4163 |
| | | | | 219/69.16 |
| 4,733,040 A * | 3/1988 | Pelloni | ..................... | B23H 7/26 |
| | | | | 219/69.16 |
| 5,051,554 A * | 9/1991 | Tsukamoto | ................ | 219/69.19 |
| 5,267,141 A | 11/1993 | Morita et al. | | |
| 5,545,870 A | 8/1996 | Fujii et al. | | |
| 5,589,086 A * | 12/1996 | Sawada et al. | ............. | 219/69.16 |
| 5,847,348 A | 12/1998 | Allison | | |
| 6,844,519 B2 | 1/2005 | Ito | | |
| 7,041,933 B2 | 5/2006 | Forrester et al. | | |
| 7,329,825 B2 * | 2/2008 | Awakura | | |
| 2002/0148814 A1 * | 10/2002 | Ishiwata et al. | ............. | 219/69.2 |
| 2003/0173337 A1 | 9/2003 | Ito | | |

FOREIGN PATENT DOCUMENTS

| | | | |
|---|---|---|---|
| JP | 2-190218 A * | 7/1990 | |
| JP | 10-138048 A * | 5/1998 | |
| JP | 2000-190131 A * | 7/2000 | |
| JP | 2000190131 A | 7/2000 | |

(Continued)

OTHER PUBLICATIONS

Machine translation of Japan Patent document No. 2000-190,131, Jun. 2015.*

(Continued)

*Primary Examiner* — Geoffrey S Evans
(74) *Attorney, Agent, or Firm* — Warner Norcross and Judd LLP

(57) ABSTRACT

An electrical discharge machining (EDM) system and method including (a) an electrode supported by a spindle, (b) a spindle support, (c) a workpiece holder, (d) a gap voltage measurement device, and (d) a single integrated controller. The single integrated controller is responsive to the measured gap voltage to control all of the spindle, the spindle support, and the workpiece holder, providing improved speed, accuracy, and part quality.

14 Claims, 6 Drawing Sheets

(56) References Cited

FOREIGN PATENT DOCUMENTS

| | | | | |
|---|---|---|---|---|
| JP | 2003-165031 A | * | 6/2003 | |
| JP | 2004-188550 A | * | 7/2004 | |

OTHER PUBLICATIONS

Machine translation of Japan Patent document No. 10-138,048, Jan. 2016.*

* cited by examiner

ELECTRICAL DISCHARGE MACHINING INTEGRATED CONTROL SYSTEM

BACKGROUND OF THE INVENTION

The present invention relates to electrical discharge machining (EDM) systems and methods, and more particularly to control systems for such systems and methods.

Electrical discharge machining (EDM), also referred to as spark machining, spark eroding, burning, die sinking, wire burning, or wire erosion, is a manufacturing process whereby a desired shape is obtained using electrical discharges. Material is removed from the workpiece by a series of rapidly recurring current discharges between two electrodes. One of the electrodes is the tool, or simply the electrode, and the other of the electrodes is the workpiece.

EDM systems and methods, and control systems for such systems and methods, are well known to those skilled in the art. An example of a prior art EDM system is illustrated in FIG. 1. The prior art system 10 includes an electrode 12, a spindle support 14, and a workpiece holder 16. The electrode 12 moves along a linear axis Z'. The spindle support 14 moves a spindle, holding the electrode, along three linear axes X, Y, and the Z. The workpiece holder 16 moves about two rotational axes A and B.

The system 10 further includes an EDM controller 18 and a machine axis position controller 20. Process recipes are stored in a memory 22. The movement of the electrode 12 along the Z' axis is controlled by the EDM controller 18. The movement of the spindle support 14 and the workpiece support 16 along and about the X, Y, Z, A, and B axes is controlled by the machine axes controller 20. The target Z' position is determined based on a measured gap voltage between the expendable electrode 12 and the workpiece. The program flowchart for the described system is illustrated in FIG. 2.

The described EDM system has proven to be highly effective for machining straight through-going holes. Problems are presented, however, when the approach is applied to the drilling and/or milling of three-dimensional shapes. The machine axes controller 20 presents the workpiece by way of rotary axes A and B and controls the tool position by moving the spindle support along axes X, Y, and Z. The EDM controller 18 positions the electrode 12 on the Z' axis based on a gap voltage and calculated parameters and applies power supply settings based on a single recipe for a given hole.

However, the described EDM system has at least three drawbacks. First, after a burn is initiated, the process recipe cannot be changed without stopping the programmed tool path. Second, while the burn runs as a closed loop process for the Z' axis, the burn runs as an open loop process for the X, Y, Z, A, and B axes. Consequently, movement along or about these axes is unaffected by anything happening during the burn. Third, only the EDM controller 18 is responsive to the gap voltage and other burn parameters. All of these drawbacks negatively impact dimensional accuracy, hole surface quality, and cycle time.

SUMMARY OF THE INVENTION

The present invention addresses the aforementioned problem by providing an EDM system including a single integrated control system controlling all of the workpiece holder, the spindle support, and the spindle/electrode.

The EDM system includes a spindle (adapted to support) an electrode, a spindle support (which may be integral with the spindle), a workpiece support, a voltage gap measurement device, and a single integrated controller operatively connected to the other elements. The controller includes memory for storing workpiece programs. The controller operates in accordance with the workpiece programs and in response to the gap voltage and other parameters (e.g. on/off time, current, voltage, and capacitance) to control the spindle and the workpiece support positions.

The present EDM system provides an integrated, multiple-axis, motion controller and EDM power supply controller capable of producing custom-shaped holes. The single integrated controller controls the motion system and the EDM system, allowing for a seamless connection and adjustment of system parameters. The system includes a single vertical axis Z without a separate axis Z'. The integrated controller provides coordinated control of (1) the motion control system including axes X, Y, Z, A, and B), (2) the part program paths defined by the workpiece recipes, (3) the speed along the paths, and (4) the forward/reverse direction along the path during the burn.

The single integrated controller greatly reduces the inherent barriers that limit the effectiveness of prior control systems. The electrode path and the workpiece holder position are controlled with modulation of the speed and the forward/reverse direction along the path controlled responsive to the gap voltage and the EDM power supply recipe settings. This modulation of the speed and the direction along the programmed path improves dimensional accuracy, surface quality, and cycle time.

These and other advantages and features of the invention will be more fully understood and appreciated by reference to the description of the current embodiment and the drawings.

DESCRIPTION OF THE CURRENT EMBODIMENT

Figure 1:
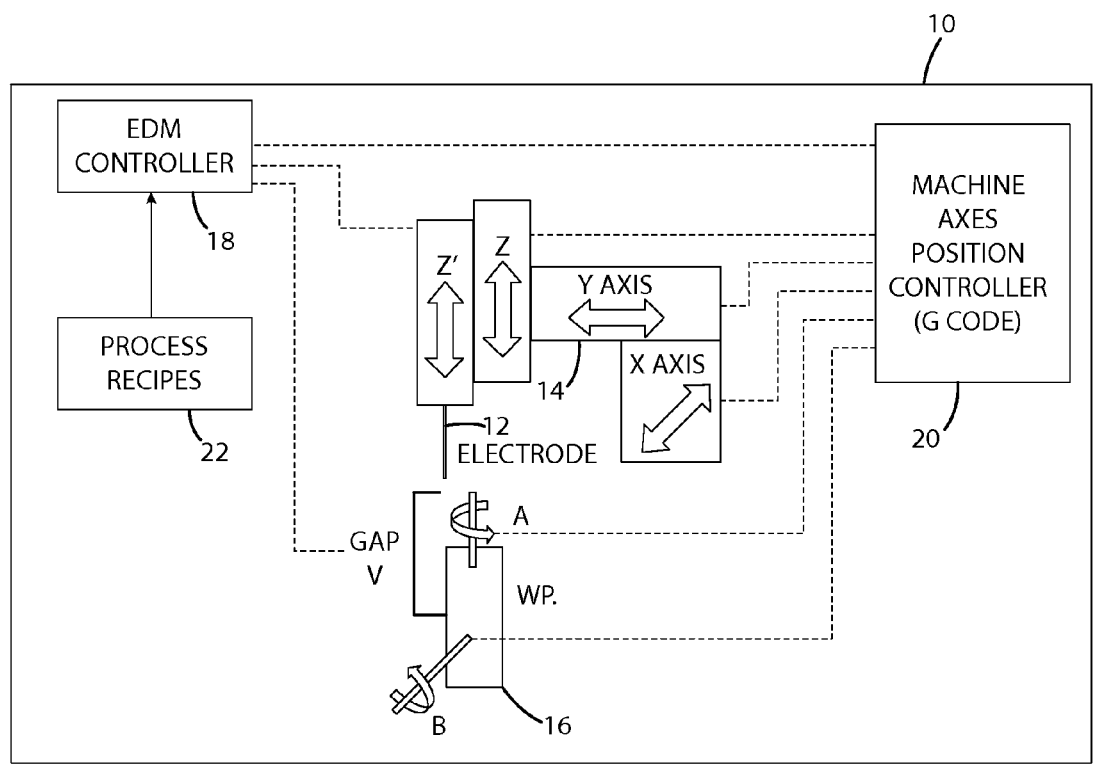
FIG. 1 is a schematic diagram of a prior art electrical discharge machining (EDM) system.
Figure 2:
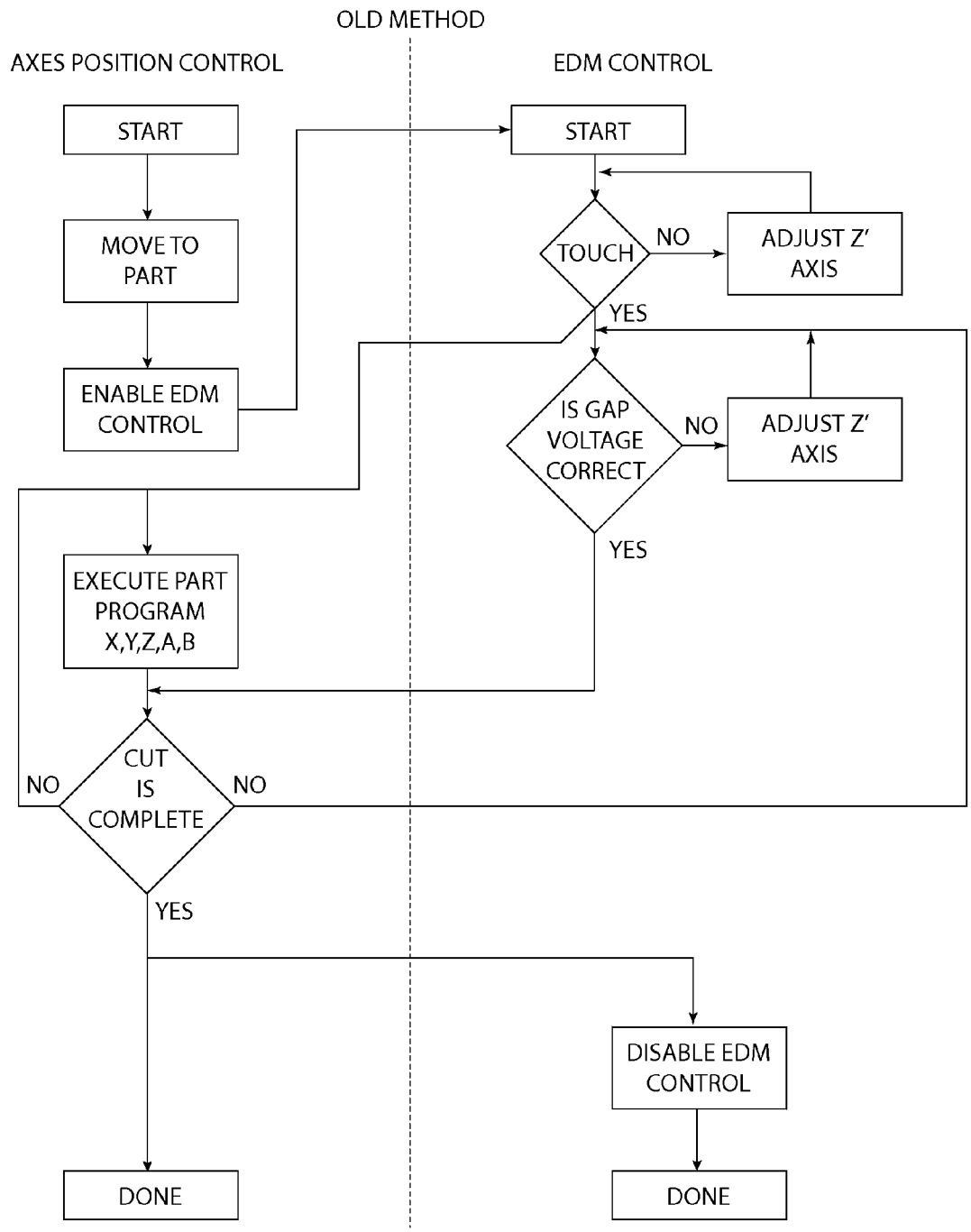
FIG. 2 is a flowchart illustrating the program flow of the prior art EDM system.
Figure 3:
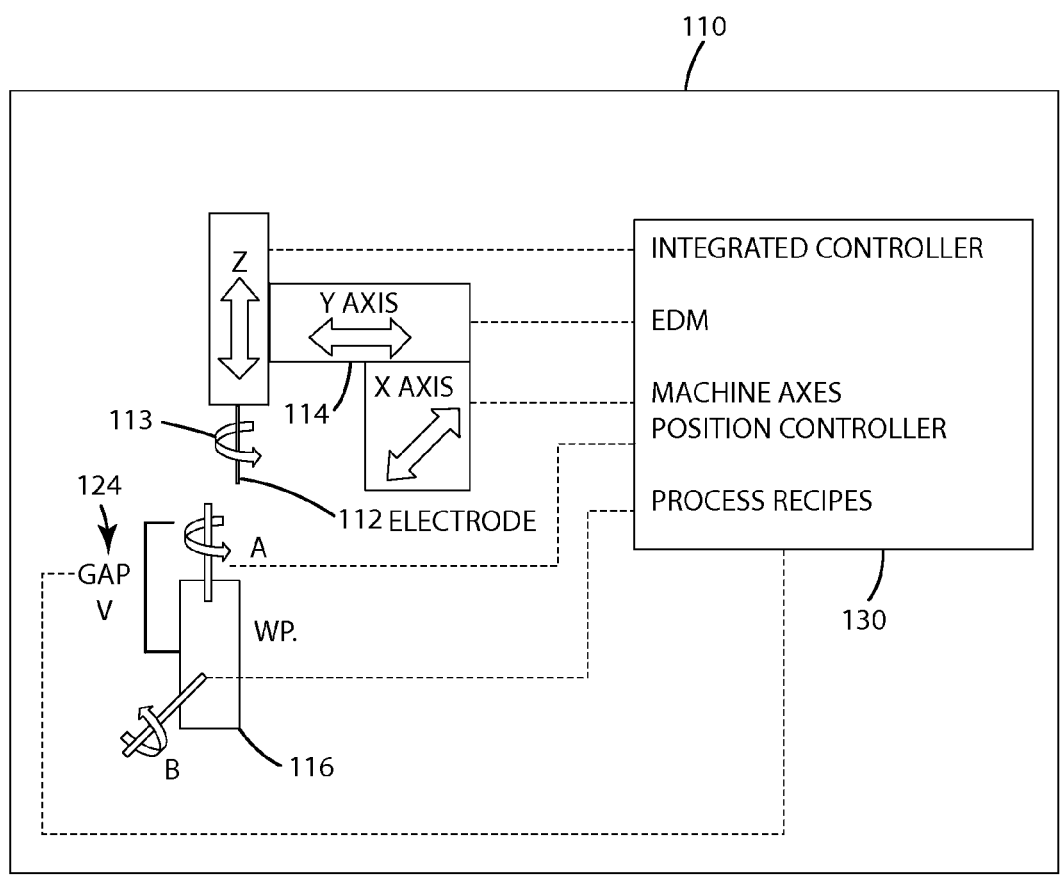
FIG. 3 is a schematic diagram of an EDM system in accordance with a current embodiment of the invention.
Figure 4:
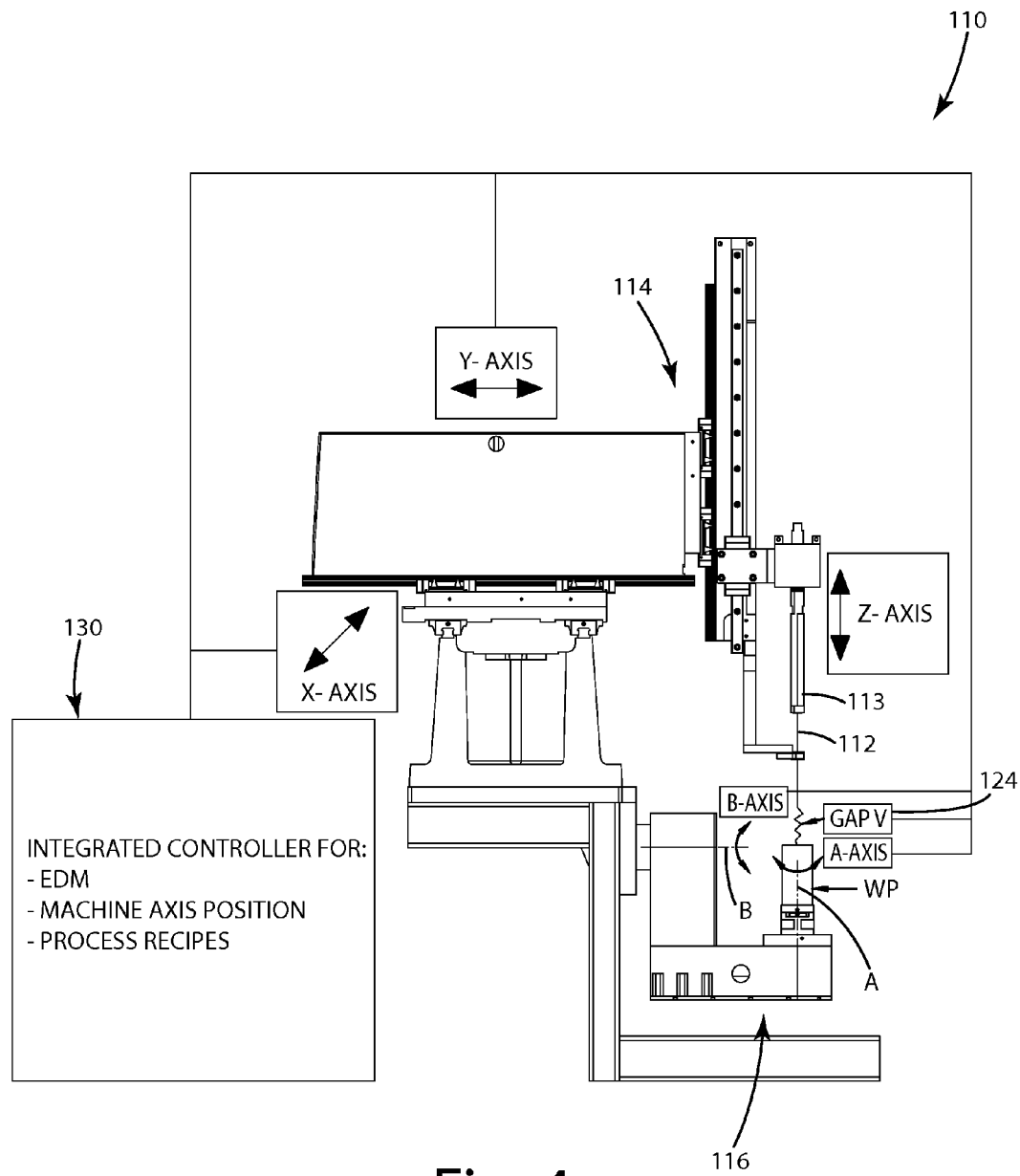
FIG. 4 is a side view of the EDM system.
Figure 5:
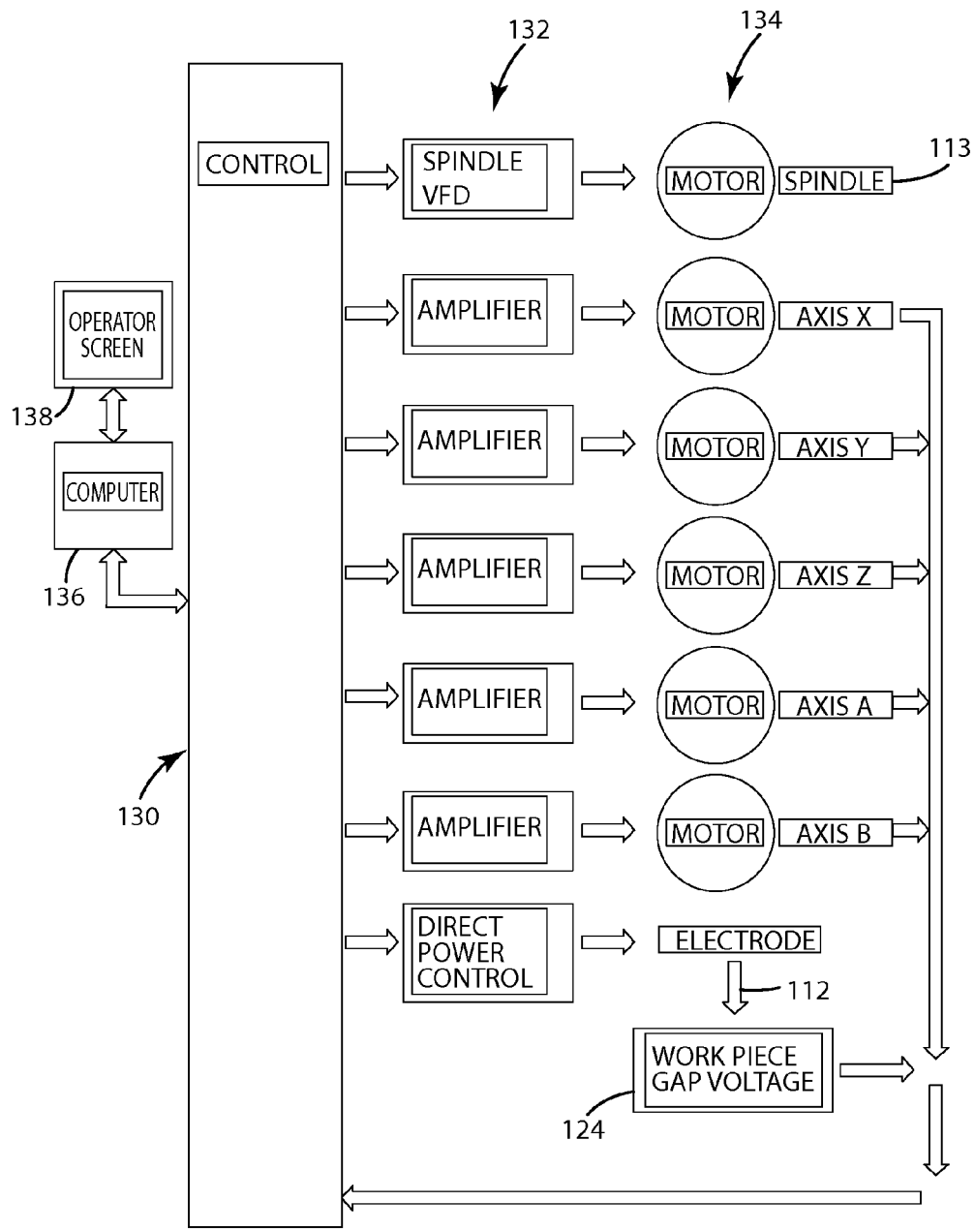
FIG. 5 is a schematic diagram showing the operative connections of the single integrated controller of the EDM system; and See EDIT

An electrical discharge machining (EDM) system constructed in accordance with a current embodiment of the invention is illustrated in FIGS. 3-5 and generally designated 110. The system includes an electrode 112, a spindle support 114, a workpiece support 116, a gap voltage measuring device 124, and a single integrated controller 130.

The electrode 112 is supported by a spindle 113 that is supported by, and may be integral with, the spindle support 114 (see FIG. 4). The spindle support 114 is capable of moving the electrode 112 along axes X, Y, and Z with respect to the workpiece support 116. The workpiece position may be moved toward and away from the electrode 112 along the axes A and B. The electrode is a consumable. The spindle 113 and the electrode 112 may be any spindle and electrode known to those skilled in the art.

The spindle support 114 supports the spindle and therefore the electrode 112. The spindle support 114 is capable of moving the spindle 113, and therefore the electrode 112, along three orthogonal linear axes X, Y, and Z. The spindle support 114 may be any spindle support known to those skilled in the art.

The workpiece support 116 supports a workpiece (not illustrated) for machining. The workpiece support 116 is capable of moving about two orthogonal rotational axes A and B. The workpiece support 116 may be any workpiece support known to those skilled in the art.

The gap voltage measurement device 124 measures the voltage between the electrode 112 and the workpiece WP. The device 124 may be any suitable voltage measurement device known to those skilled in the art.

The single integrated control system 130 and its operative connection to the other compliments is novel to the present invention. As illustrated in FIG. 5, the control 130 is operatively connected through amplifiers 132 to motors 134 that control each of the spindle 113, the X axis, the Y axis, the Z axis, the A axis, the B axis, and the power to the electrode 112. The control 130 also is operatively connected to the gap voltage measuring device 124, so that the control system 130 receives the gap voltage as an input. The control system 130 includes an interface computer 136 and an operator screen 138.

As seen in FIGS. 3-5, the integrated controller 130 is operatively connected to the spindle 113, the spindle support 114, the workpiece support 116, and the gap voltage measurement device 124. The integrated controller 130 receives the measured gap voltage as an input, and the controller outputs control signals to the spindle 113, the spindle support 114, and the workpiece support 116. The integrated controller 130 controls the movement of the spindle support 114 along a three-dimensional (3-D) path defined by the linear X, Y, and Z axes. The integrated controller 130 controls the movement of the workpiece holder 116 about the rotational A and B axes.

Figure 6:
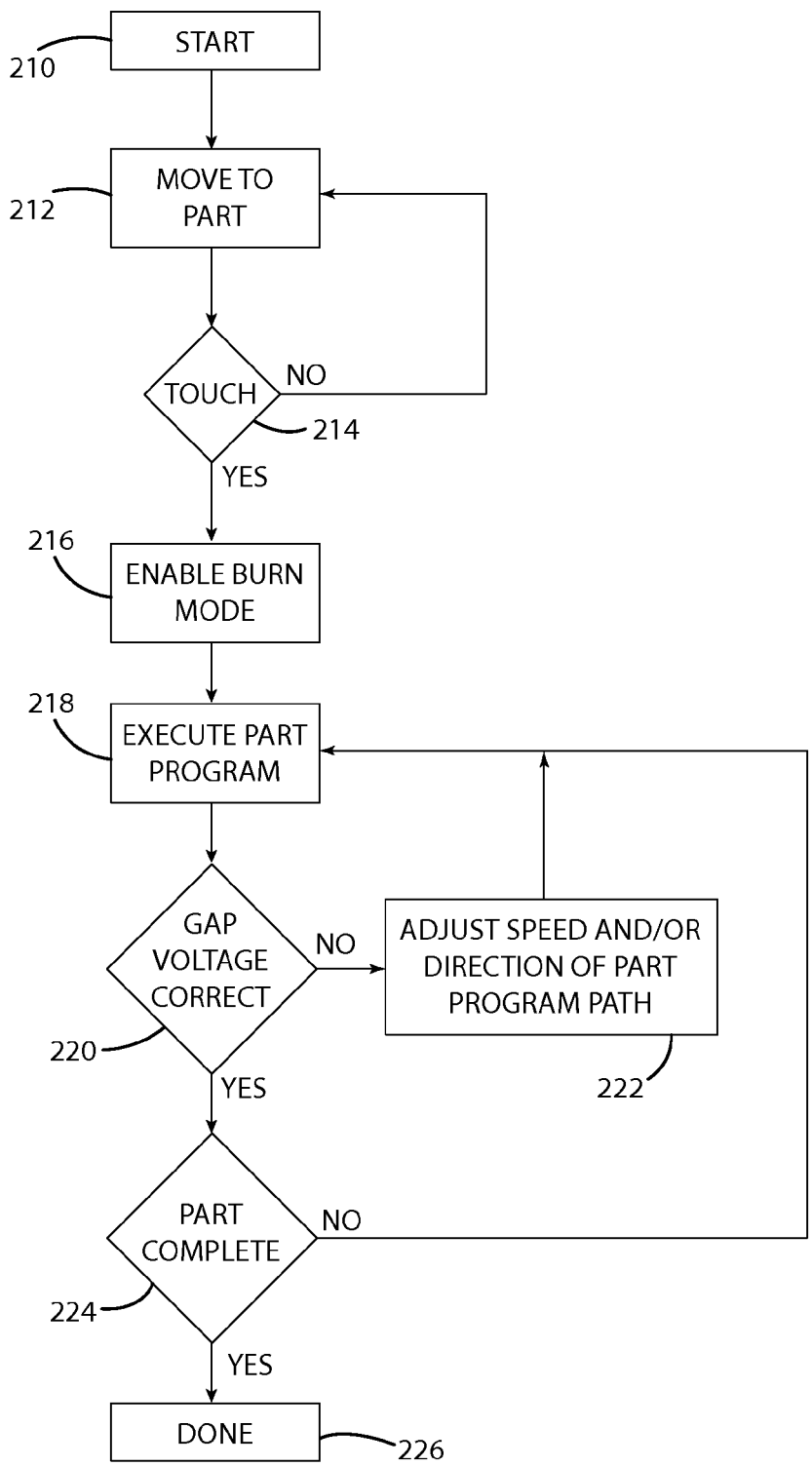
FIG. 6 is a flowchart illustrating the program flow of the EDM system.

FIG. 6 illustrates the operation of the EDM system 110 under the control of the single integrated control system 130. Prior to the execution of the program flow, a workpiece WP is loaded onto the workpiece support 116. The operator then initiates a start command 210, and the initial step is to move 212 the spindle 113 toward the workpiece WP until the electrode 112 touches 214 the workpiece WP. When contact is made, the control system 130 initiates 216 a burn mode following which the part program is executed 218.

The control system constantly monitors 220 for correct gap voltage. If the gap voltage is incorrect, the control system 130 adjusts 222 the speed and/or direction of the part program path. So long as the gap voltage remains correct, the control system 130 determines or monitors 224 if the part is complete. If the part is not complete, program flow returns to box 218. If the part is complete, program flow terminates 226 and the operator is alerted, for example, by way of the operator screen 138.

The measured variables (primarily the electrode gap voltage) are used to control and/or modulate the spindle support 114 and the workpiece support 116 during the EDM burn function. Additionally, the control system 130 can even reverse the motion program of the spindle support 114 and/or the workpiece support 116 along a multi-axis path as required to maintain an appropriate or desired Voltage.

The system utilizes an open-architecture, multiple-axis, motion controller to control multiple axes (X, Y, Z, A, and B) and the spindle 113. The control system 130 also controls the EDM power supply. Consequently, all functions are controlled by the single integrated control system.

The software or other program control for operating the control system 130 can be prepared by one of ordinary skill in the art in view of this specification and the attached drawings.

The gap voltage (i.e. the voltage between the electrode and the workpiece) is used to control a feed-rate override aspect of the part program. The feed-rate override works in both the forward direction and the reverse direction during a burn cycle. When initiated, the control program will execute at a "normal" or defined speed. As the gap voltage changes, the control program changes the speed and/or direction of the movement along or about one or more of the axes. The feed-rate override maintains a desired gap voltage, thus providing precise control to the EDM burning process. Because all functions are controlled by the single integrated controller 130, responses to gap voltage fluctuations are recognized relatively quickly and responded to relatively accurately.

For any particular part, the part program includes programmed axes and a generated move path. Once the burn is initiated, the gap voltage is monitored for deviation from the target or desired gap voltage. The integrated control 130 issues axes commands to follow the part program path, while maintaining the desired gap voltage. As the gap voltage varies from the target gap voltage, the integrated control 130 may dynamically adjust or modulate the speed and the direction of the movement along all of the axes. When the gap voltage is at the requested set point, the program control executes the part program path at the programmed speed and direction. If the gap voltage increases above the target, the integrated controller 130 executes speed increases while staying on the program path. If the gap voltage falls below the target, the program execution speed decreases to maintain the gap voltage at the target. Further, if necessary in order to maintain the gap voltage, the integrated controller 130 will reverse the direction of the program path directly along that programmed path.

Precise control of the EDM power and other functions are maintained under direct control of the integrated controller 130. An operator is allowed to select parameters such as on/off times, current, capacitance, and voltage by way of a multiple-recipe file. These recipes can be activated in any chosen section of the part program operation.

Recipes are set up within the integrated control 130, allowing for direct part program modification while in burn operation. The process recipe can be changed by the controller 130 without interrupting the burn cycle.

As will be appreciated, the EDM system and method including the single integrated controller 130 provides improved speed, accuracy, and part quality.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. An electrical discharge machining (EDM) system comprising:
   an integrated control including a workpiece program memory adapted to store a workpiece program defining a multi-axis program path of an electrode with respect to a workpiece;
   a workpiece support adapted to support the workpiece, the workpiece support operatively connected to and controlled by the integrated control;
   a spindle movably supporting the electrode, the spindle operatively connected to and controlled by the integrated control;
   a spindle support supporting the spindle, the spindle support operatively connected to and controlled by the integrated control; and
   a gap voltage measurement system adapted to measure the gap voltage between the electrode and the workpiece;
   the integrated control being operatively connected to the gap voltage measurement system, the integrated control being dynamically responsive to the measured gap voltage, the integrated control dynamically controlling both the speed along the multi-axis program path and the forward or reverse direction along the multi-axis program path to dynamically maintain a desired gap voltage by dynamically controlling the movement of the workpiece support, the electrode, and the spindle support.

2. An EDM system as defined in claim 1 wherein the workpiece support is movable about A and B rotational axes.

3. An EDM system as defined in claim 2 wherein the spindle support is movable along a Z' linear axis.

4. An EDM system as defined in claim 3 wherein the electrode is movable along X, Y, and Z linear axes, the Z and Z' linear axes being substantially parallel.

5. An EDM system as defined in claim 1 wherein the electrode is movable along a Z' linear axis.

6. An EDM system as defined in claim 5 wherein the spindle support is movable along X, Y, and Z linear axes, the Z and Z' linear axes being substantially parallel.

7. An EDM system as defined in claim 1 wherein the spindle support is movable along X, Y, and Z linear axes.

8. An electrical discharge machining (EDM) method comprising:
   providing an EDM system including a spindle supporting an electrode, a spindle support supporting the spindle, a workpiece support supporting a workpiece, and a gap voltage measuring system adapted to dynamically measure a gap voltage between the electrode and the workpiece supported by the workpiece support;
   storing a workpiece program in memory, the workpiece program defining a multi-axis program path of the electrode with respect to the workpiece; and
   dynamically controlling the spindle, the spindle support, and the workpiece support in response to the workpiece program and the gap voltage measuring system using an integrated controller operatively connected to the spindle, the spindle support, and the workpiece support, the dynamic controlling step including dynamically controlling both the speed along the multi-axis program path and the forward or reverse direction along the multi-axis program path to maintain a desired gap voltage.

9. An EDM method as defined in claim 8 wherein the controlling step includes controlling the movement of the workpiece support about A and B rotational axes.

10. An EDM method as defined in claim 9 wherein the controlling step includes controlling the movement the spindle support along a Z' linear axis.

11. An EDM method as defined in claim 10 wherein the controlling step includes controlling the movement of the electrode along X, Y, and Z linear axes, the Z and Z' linear axes being substantially parallel.

12. An EDM method as defined in claim 8 wherein the controlling step includes controlling the movement of the electrode along a Z' linear axis.

13. An EDM method as defined in claim 12 wherein the controlling step includes controlling the movement of the spindle support along X, Y, and Z linear axes, the Z and Z' linear axes being substantially parallel.

14. An EDM method as defined in claim 8 wherein the controlling step includes controlling the movement of the spindle support along X, Y, and Z linear axes.

* * * * *